United States Patent [19]
Rollett

[11] 3,906,390
[45] Sept. 16, 1975

[54] TRANSFER FUNCTION CONTROL NETWORKS

[75] Inventor: John Mortimer Rollett, London, England

[73] Assignee: The Post Office, London, England

[22] Filed: Oct. 23, 1974

[21] Appl. No.: 517,147

[30] Foreign Application Priority Data

Oct. 26, 1973 United Kingdom............... 49974/73

[52] U.S. Cl................................... 330/107; 330/109
[51] Int. Cl.[2]........................................... H03F 1/36
[58] Field of Search............. 330/107, 109; 331/141

[56] References Cited

UNITED STATES PATENTS 3,838,351 9/1974 Hekimian........................ 330/107 X

OTHER PUBLICATIONS

Mitra; S. K., Proceedings of the Hawaii International Conference on System Sciences, January 1968, pp. 433–436.

*Primary Examiner*—R. V. Rolinec
*Assistant Examiner*—Lawrence J. Dahl
*Attorney, Agent, or Firm*—Kemon, Palmer & Estabrook

[57] ABSTRACT

A network particularly useful in thick or thin film circuitry for use in telecommunication systems provides either an all-pass or notch filter function with the same basic component layout but with variously dimensioned component values. The circuit consists of a differential input operational amplifier having both inverting and non-inverting inputs connected by way of first and second resistors respectively to an input terminal (the second resistor being in parallel with a first capacitor) and having its output terminal connected to its inverting input by way of a third resistor and connected by way of a fourth resistor in series with a second capacitor to its non-inverting input, the network having a reference terminal connected by way of a fifth resistor to the junction between the second capacitor and the fourth resistor so as to provide an input port between the reference terminal and the input terminal and an output port between the reference terminal and the amplifier output.

7 Claims, 3 Drawing Figures

TRANSFER FUNCTION CONTROL NETWORKS

The invention relates to a transfer function control network. The invention provides a common design of circuit which may be tailored to function as an all-pass filter or a notch filter. The invention is particularly suitable for fabrication using known micro-electronic techniques.

In telecommunication systems, to which the invention is particularly suitable, it is often important to shape, not only the magnitude response of the transmission channel but also the phase characteristic. Networks which have a loss independent of frequency, but a varying phase characteristic, are known as all-pass networks, and by connecting suitable all-pass networks in tandem with a transmission system the phase across the band width of the system can be adjusted to meet a required characteristic. It is often necessary to linearise the group delay which is caused by a varying transmission velocity with frequency. The phase behaviour of a system may be conveniently considered in terms of its "envelope delay." The all-pass networks added in tandem with the transmission system can then be regarded as increasing the delay in various parts of the frequency spectrum until the delay over the whole band of interest is substantially constant. Such arrangements are known as delay equalisers.

Until recently, all-pass delay equalisers were generally constructed with coils and capacitors which made the equalisers bulky and heavy. By using active circuits and obviating the need for coils, a circuit may be designed utilising only resistors, capacitors and active devices, such as operational amplifiers.

According to the present invention there is provided a transfer function control network comprising a differential input operational amplifier having an inverting input, a non-inverting input and an output, and having a high gain A; a first element having an admittance $Y_1$ and connected between the said output and the inverting input of the amplifier; a second element having an admittance $Y_2$ and connected between a signal input terminal and the non-inverting input of the amplifier; a third element having an admittance $Y_3$ and a fourth element having an admittance $Y_4$ connected in series between the non-inverting input and the output of the amplifier; a fifth element having an admittance $Y_5$ and connected between a reference terminal and the junction between the third and fourth elements; and a sixth element having an admittance $Y_6$ and connected between the signal input terminal and the inverting input terminal of the amplifier, the arrangement being such that when an input signal $V_i$ is applied between the signal input terminal and the reference terminal an output signal $V_o$ is derived from between the output of the amplifier and the reference terminal so that the transfer function:

$$\frac{V_o}{V_i} = \frac{Y_1 Y_2 (Y_3 + Y_4 + Y_5) - Y_6 Y_3 (Y_4 + Y_5)}{Y_1 Y_2 (Y_3 + Y_4 + Y_5) + Y_1 Y_3 Y_5 - Y_3 Y_4 Y_6 + E/A}$$

where, to a first approximation:

$$E/A = (Y_1 + Y_6) \left\{ Y_2 (Y_3 + Y_4 + Y_5) + Y_3 (Y_4 + Y_5) \right\} \left[ \frac{1}{A_o} + \frac{s}{2\pi f_T} \right]$$

and where:

$s$ is the complex frequency variable;

$A_o$ is the d.c. gain of the amplifier at very low frequencies; and $f_T$ is characteristic of the frequency performance of the amplifier, that is to say, the gain-bandwidth product of the amplifier.

It is known that the transfer function of a second-order all-pass delay equaliser may be written in terms of $s$ as:

$$\frac{as^2 - bs + c}{as^2 + bs + c} = \frac{V_o}{V_i}$$

By considering the six elements denoted above by their admittances $Y_1$ to $Y_6$ in terms of their conductances G and/or capacitances. The second element consists of a resistor having a conductance $G_2$ in parallel with a capacitor $C_2$ and wherein the third element consists of a capacitor $C_3$. All the remaining elements $G_1 G_4 G_5$ and $G_6$ consist of resistors, the transfer function for the circuit may be written in terms of the conductance and the capacitances of the components as:

$$\frac{V_o}{V_i} = \frac{G_2 G_{45} + sC_3 \left\{ G_2 + (G_4 + G_5) \left[ \frac{C_2}{C_3} - \frac{G_6}{G_1} \right] \right\} + s^2 C_2 C_3}{G_2 G_{45} + sC_3 \left\{ G_2 + G_5 + (G_4 + G_5) \left( \frac{C_2}{C_3} - \frac{(G_6}{G_1} \right) G_4 \right\} + s^2 C_2 C_3}$$

The condition for achieving all-pass behaviour for the circuit is for the coefficients of $s$ in the numerator and denominator of the above equation to be equal but opposite in sign so that:

$$G_2 + G_5 + (G_4 + G_5) \left( \frac{C_2}{C_3} \right) - \left( \frac{G_6}{G_1} \right) G_4 = -G_2 - (G_4 + G_5) \left[ \left( \frac{C_2}{C_3} \right) - \left( \frac{G_6}{G_1} \right) \right]$$

which may be written as:

$$2G_4 \left\{ \left( \frac{G_6}{G_1} \right) - \left( \frac{C_2}{C_3} \right) \right\} + G_5 \left\{ \left( \frac{G_6}{G_1} \right) - 1 - 2 \left( \frac{C_2}{C_3} \right) \right\} - 2G_2 = 0$$

According to a further aspect of the invention the general transfer function for a notch filter is of the form:

$$\frac{as^2 + c}{as^2 + bs + c}$$

In this above equation considered in terms of the conductance and capacitance of the elements of the circuit it is possible to define the condition for a notch filter as existing when:

$$G_2 + (G_4 + G_5)\left[\left(\frac{C_2}{C_3}\right) - \left(\frac{G_6}{G_1}\right)\right] = 0$$

In most cases it is possible to choose the capacitors of the circuit to have substantially equal values and to adjust the operating frequency or frequency band of the circuit by suitable selection or trimming of the resistors.

It will be appreciated that the component layout for an all-pass filter and a notch filter is identical and so the relative costs of the circuit may be reduced by making the production process for both types of filter substantially identical in construction layout and fabrication. The differences may be achieved by adding different values of discrete components to the, for example, thin film circuit, or by trimming the resistors of the circuit to different values.

One embodiment of each of the aspects of the invention will now be described, by way of example, with reference to the accompanying diagrammatic drawings in which.

Figure 1:
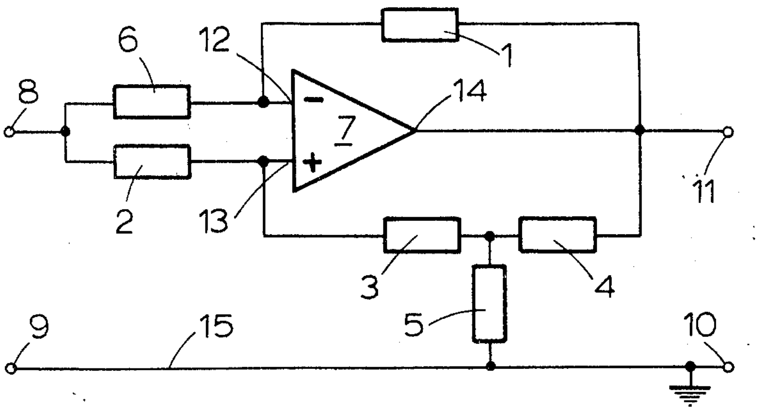
FIG. 1 shows the circuit in a general form.

Referring now to FIG. 1, the circuit comprises six elements represented by the reference numerals 1 to 6 and having admittances $Y_1$ to $Y_6$ respectively. The six elements are connected in a network with an amplifier 7 between a pair of input terminals 8 and 9 and a pair of output terminals 10 and 11. The amplifier 7 is a differential input operational amplifier having an inverting input 12, a non-inverting input 13 and an output 14. A line 15 directly connecting the input terminal 9 to the output terminal 10 is earthed.

The element 1 is connected between the inverting input 12 and the output 14. The element 2 is connected between the input terminal 8 and the non-inverting input terminal 13. The element 3 is connected in series with the element 4 between the non-inverting input 13 and the output 14. The element 5 is connected between the line 15 and the junction between the elements 3 and 4. The element 6 is connected between input terminal 8 and the inverting input 12.

From an analysis of the circuit of FIG. 1, it will be seen that the transfer function which is the ratio between the output voltage $V_o$ occurring between the terminals 10 and 11 to the input voltage $V_i$ which is the voltage applied between the terminals 8 and 9 may be represented by the following equation:

$$\frac{V_o}{V_i} = \frac{Y_1Y_2(Y_3 + Y_4 + Y_5) - Y_6Y_5(Y_4 + Y_5)}{Y_1Y_2(Y_3 + Y_4 + Y_5) + Y_1Y_3Y_5 - Y_3Y_4Y_6 + E/A} \quad (1)$$

In the above equation (1) the expression $A$ represent the gain of the high gain differential input operational amplifier 7, and $E$ is a complicated function in terms of the admittances which will be explained later. The term $E/A$ is small, assuming the gain $A$ is very high and for many purposes it may be neglected. The gain $A$ is related to the voltages at the inverting input 12 ($v_-$) and the voltage at the non-inverting input 13 ($v_+$) by the expression:

$$V_o = A\,(v_+ - v_-)$$

The general transfer function of a second-order all-pass delay equaliser is:

$$\frac{as^2 - bs + c}{as^2 + bs + c} = \frac{V_o}{V_i} \quad (2)$$

By a suitable choice of the components and their values the transfer function of the network of FIG. 1 can be made to have the same form as the general transfer function set out in the equation (2) above.

Figure 2:
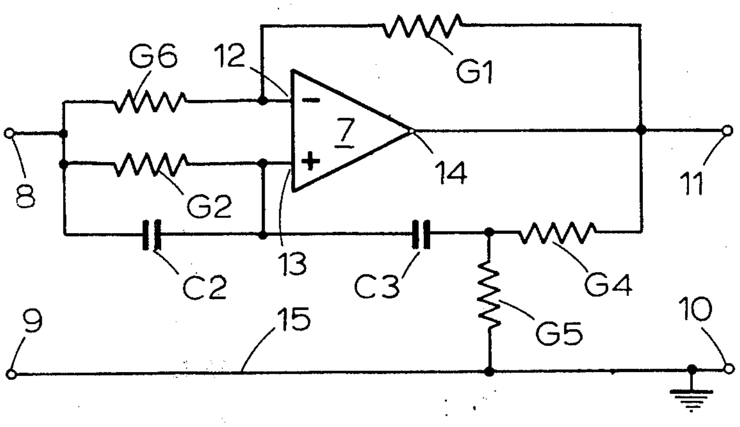
FIG. 2 shows the circuit of FIG. 1 with specific components.

FIG. 2 illustrates the components necessary to produce an all-pass filter suitable for use as a delay equaliser and having a general transfer function of the type shown in the equation (2). Referring now also to FIG. 2 the circuit components have been given references which link them to the generalised elements illustrated in FIG. 1. That is to say, the element 1 is denoted in FIG. 2 by a resistor $G_1$ which also represents the specific conductance of the resistor. The element 2 shown in FIG. 1 is represented in FIG. 2 by two components namely a resistor $G_2$ and a capacitor $C_2$ which, as for the notation used with the resistors represents the capacitance of the capacitor forming part of the element 2. The element 3 of FIG. 1 is represented in FIG. 2 by the capacitor $C_3$, and the remaining elements in FIG. 2 are all resistors represented by their conductance references $G_4$, $G_5$, and $G_6$. The remaining reference numerals shown on FIG. 2 correspond with the reference numerals shown on FIG. 1 and are used to denote similar integers.

The expression for the transfer function of the circuit shown in FIG. 2 may be written in terms of the conductance and capacitance of the circuit components as:

$$\frac{V_o}{V_i} = \frac{G_2G_{45} + sC_3\left\{G_2 + (G_4 + G_5)\left[\left(\frac{C_2}{C_3}\right) - \left(\frac{G_6}{G_1}\right)\right]\right\} + s^2C_2C_3}{G_2G_{45} + sC_3\left\{G_2 + G_5 + (G_4 + G_5)\left(\frac{C_2}{C_3}\right) - \left(\frac{G_6}{G_1}\right)G_4\right\} + s^2C_2C_3} \quad (3)$$

The condition for achieving all-pass behaviour is for the coefficients of $s$ in the numerator and denominator of equation (3) to be equal and opposite in sign. The expression $s$ may be substituted by $j\omega$ for any particular circuit. From equation (2) the expression for an all-pass filter is therefore that:

$$G_2 + G_5 + (G_4 + G_5)\left(\frac{C_2}{C_3}\right) - \left(\frac{G_6}{G_1}\right)G_4 = -G_2 - (G_4 + G_5)\left[\left(\frac{C_2}{C_3}\right) - \left(\frac{G_6}{G_1}\right)\right] \quad (4)$$

which may be re-arranged as:

$$2G_4\left\{\left(\frac{G_6}{G_1}\right) - \left(\frac{C_2}{C_3}\right)\right\} + G_5\left\{\left(\frac{G_6}{G_1}\right) - 1 - 2\left(\frac{C_2}{C_3}\right)\right\} - 2G_2 = 0 \quad (5)$$

This condition must be substantially satisfied in order that the network shall have equal loss at all frequencies within the bandwidth over which the amplifier has sufficiently high gain. When this condition is satisfied the denominator of equation (2) becomes:

$$\left[ G_2 G_{45} + sC_3 G_5 \left\{ 1 + \left( \frac{G_6}{G_1} \right) \right\} \Big/ 2 + s^2 C_2 C_3 \right] \qquad (6)$$

The resonance frequency, $\omega_o$, close to which the delay is a maximum, is defined as:

$$\omega_o = \sqrt{\frac{c}{a}} \qquad (7)$$

and for the circuit of FIG. 2 is given by:

$$\omega_o = \sqrt{\frac{G_2 G_{45}}{C_2 C_3}} \qquad (8)$$

The delay parameter $T_o$, which is approximately the maximum delay occurring close to the resonance frequency is defined as:

$$T_o = \frac{4a}{b} \qquad (9)$$

and for the circuit of FIG. 2 is given by:

$$T_o^{-1} = \left\{ \frac{G_2 + G_5 + (G_4 + G_5) \left( \frac{C_2}{C_3} \right) - \left( \frac{G_6}{G_1} \right) G_4}{4C_2} \right\} \qquad (10)$$

From equation (10), if the coefficients of $s$ in the numerator and denominator are equal and opposite on sign then:

$$T_o^{-1} = \left\{ G_5 \left[ 1 + \left( \frac{G_6}{G_1} \right) \right] \right\} \Big/ 8C_2 \qquad (11)$$

The three equations (5), (8) and (10) impose certain constraints on the components of network, but allow several arbitrary choices to be made.

It is often necessary to adjust the performance of a network as shown in FIG. 2 after it has been constructed, by trimming one or more of the components. It is desirable, as far as possible, for the trimming operations to be independent of each other. It is generally more convenient to trim resistive components rather than capacitive components, especially for microelectronic realisation of the circuit in hybrid thick film or thin film form.

From an examination of the equation (5) it can be shown that if the following relations hold, namely:

$$\left( \frac{G_6}{G_1} \right) - 1 - 2 \left( \frac{C_2}{C_3} \right) = 0 \qquad (12)$$

then the coefficient of $G_5$ is zero, and the condition reduces to:

$$G_4 \left\{ \left( \frac{G_6}{G_1} \right) - \left( \frac{C_2}{C_3} \right) \right\} - G_2 = 0 \qquad (13)$$

The practical effect of arranging for the arbitrary condition of equation (12) to hold is that trimming the resistor $G_5$ does not upset the condition shown in equation (5). Hence $G_5$ may be trimmed to adjust the delay, as may be seen from equation (10), without upsetting the all-pass property of the network, guaranteed when the condition shown in equation (5) holds.

In many cases it is convenient to arrange for the two capacitors $C_2$ and $C_3$ to have equal values. This is a further arbitrary condition represented by the expression:

$$\left( \frac{C_2}{C_3} \right) = 1 \qquad (14)$$

It therefore follows from equation (14) and equation (12) that:

$$\left( \frac{G_6}{G_1} \right) = 3 \qquad (15)$$

and hence from equation (13) we derive the equation:

$$\left( \frac{G_2}{G_4} \right) = 2 \qquad (16)$$

This set of relations represented by the equations (14) (15) and (16) are convenient and useful in practice, although it will be evident that they are only one of many ways of ensuring that the mandatory condition of equation (5), that is to say the coefficients of $s$ in the numerator and denominator are equal and opposite in sign, is satisfied.

In practice it is unlikely that the values of the capacitors $C_2$ and $C_3$ will be exactly equal, or that the relationship between the resistive components embodied in the equations (15) and (16) will be satisfied exactly. It is an important feature of the circuit that considerable deviation from the nominal or design values of the capacitors and resistors can be tolerated, because a simple series of resistance trimming operations will adjust the network performance to meet a desired specification.

A suitable order in which to carry out the trimming operations, assuming that the elements are within a few percent of their nominal value, is as follows:

1. Adjust the resonance frequency $\omega_o$ by trimming the resistor $G_2$;
2. Adjust the magnitude of the response by trimming one or both of the resistors $G_1$ or $G_6$ so that the response is flat over the frequency range; and
3. Adjust the delay $\tau_o$ by trimming the resistor $G_5$.

Providing the condition expressed in equation (12) holds substantially, the trimming operation (3) will not upset the flat magnitude response, although the resonance frequency may alter slightly. If the trimming can only be carried out in one sense, for example in thick-film technology, the resistance may only be increased, for example by abrading the surface of the film, then a useful feature of the circuit of FIG. 2 is that in the trimming operation (2) the effect of increasing the resistances of $G_1$ or $G_6$ is to alter their ratio ($G_6/G_1$) in opposite senses, so that the ratio can be altered in either sense as necessary.

So far it has been assumed that the gain $A$ of the amplifier is sufficiently high, and the bandwidth $f_T$ sufficiently wide, so that they have no appreciable effect on the performance of the network. The effect of these two parameters can be gauged by returning to equation (1), where the term $E/A$ appears in the denominator. The expansion of this term is given by:

$$\frac{E}{A}=(Y_6+Y_1)\left\{Y_2(Y_3+Y_4+Y_5)+Y_3+(Y_4+Y_5)\right\}\left[\frac{1}{A_o}+\frac{s}{2\pi f_T}\right] \quad (17)$$

Substituting the elements shown in FIG. 2 in equation (17) then:

$$\frac{E}{A}=(G_6+G_1)\left\{(G_2+sC_2)(G_4+G_5+sC_3)+sC_3(G_4+G_5)\right\}\left[\frac{1}{A_o}+\frac{s}{2\pi f_T}\right] \quad (18)$$

It is evident that the term $E/A$ contains components proportional to $s$, $s^2$ and $s^3$. The effect of the components proportional to $s$ and $s^3$ is to alter the delay parameter $T_o$; however in practice this can be adjusted by trimming the resistor $G_5$ as already described. The effect of the component proportional to $s^2$ is to alter the frequency of the pole-pair of the network, without affecting the frequency of the zero-pair. As a result, the all-pass or flat loss characteristic is not maintained.

Figure 3:
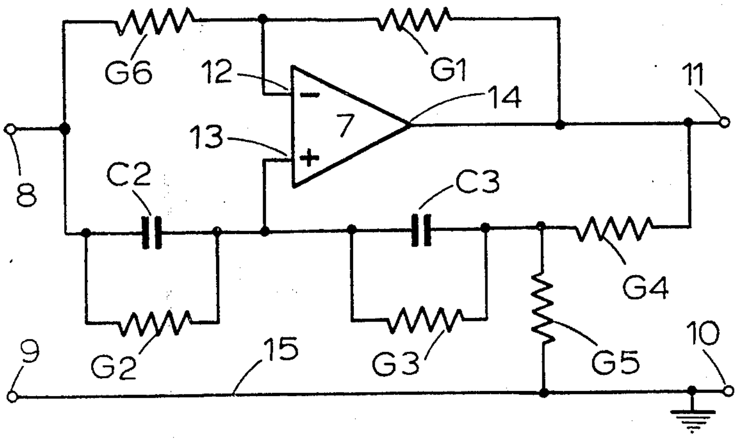
FIG. 3 shows a circuit suitable for use as an all-pass filter or as a notch filter and which may be used in tandem with further circuits to form a delay equaliser circuit for a transmission system.

In order to compensate for this effect, another element can be added to the network in the form of a resistor $G_3$ in parallel with the capacitor $C_3$. This circuit is illustrated in FIG. 3, in which the reference numerals corresponding to the components of FIG. 2 have been transferred to corresponding components in FIG. 3. The effect of adding the additional resistor $G_3$ having a conductance equal to $G_3$ is to alter the frequencies of the zero-pair and the pole-pair by different amounts, so that after trimming the resistor $G_3$ it is possible to arrange to compensate for the effect of the amplifier bandwidth and make the zero and pole frequencies the same. If necessary, it is possible to calculate the value of the resistor $G_3$ for any given amplifier with a known $f_T$, so that the value need not be subsequently trimmed.

It is possible to cascade a number of the circuits shown in FIGS. 2 or 3 with similar circuits so as to build up a desired delay characteristic over the bandwidth of a transmission system. It should be noted that the gain over the bandwidth is substantially equal to 1 for the circuit as shown in FIG. 2, however, when the resistor $G_3$ is added it departs slightly from unity but it has been found in practice that this deviation is not normally more than 5 percent.

In the practical realisation of the circuit in thin or thick film form it is likely that the capacitors will have a parallel resistive loss. However, the circuit can compensate for such lossy capacitors by modifying the value of the resistors $G_2$ and $G_3$ as shown in FIG. 3.

In one practical embodiment of the circuit of the FIG. 3, the components had the following values:

Resistor $G_1$ = 3 k ohms
Resistor $G_2$ = 2.35 k ohms
Resistor $G_3$ = 100 k ohms
Resistor $G_4$ = 4.7 k ohms
Resistor $G_5$ = 10 k ohms
Resistor $G_6$ = 1 k ohms
Capacitor $C_2$ = 30 nF
Capacitor $C_3$ = 30 nF With such circuit values the resonance frequency of the circuit was 1.93 kHz, and the calculated delay was 0.6 msecs at the resonance frequency, compared with 0.045 msecs at low frequencies. The magnitude response was adjustable to be within ± 0.02dB of a constant loss of 0.25dB.

With the circuit of FIG. 2, it is possible to use the same component configuration to produce a "notch" filter. A notch filter is a filter with a high attenuation centred on one frequency, and a gain of unity elsewhere. The general transfer function for a notch filter is:

$$\frac{V_o}{V_i}=\frac{as^2+c}{as^2+bs+c} \quad (19)$$

With the notch filter circuit the condition set out in equation (5), which was appropriate to the all-pass filter is now replaced by the condition set out in equation (20) below, which is derived from equation (3) as:

$$G_2+(G_4+G_5)\left[\left(\frac{C_2}{C_3}\right)-\left(\frac{G_6}{G_1}\right)\right]=0 \quad (20)$$

Once again there are various ways of achieving this condition in practice. One set of arbitrary conditions is as follows:

$$\left(\frac{C_2}{C_3}\right)=1 \quad (21)$$

$$\left(\frac{G_6}{G_1}\right)=2 \quad (22)$$

$$\left(\frac{G_2}{G_4+G_5}\right)=1 \quad (23)$$

This choice leads to the nominal satisfying of equation (20) and the exact satisfaction can be achieved by trimming one or both of the resistors $G_1$ and $G_6$. This trimming may be done in a series of trimming operations similar to those detailed above for the all-pass filter circuit. With the notch filter it is possible to include a resistor $G_3$ as shown in FIG. 3. The inclusion of the resistor $G_3$ can compensate for the amplifier bandwidth.

In a practical realisation of the notch filter circuit the components had the following values:

Resistor $G_1$ = 3 k ohms
Resistor $G_2$ = 4.5 k ohms
Resistor $G_3$ = 100 k ohms
Resistor $G_4$ = 4.7 k ohms
Resistor $G_5$ = 100 k ohms
Resistor $G_6$ = 1.5 k ohms
Capacitor $C_2$ = 30 nF
Capacitor $C_3$ = 30 nF This circuit gave a rejection frequency of 1.18 kHz and the depth of the notch (after trimming) was 50dB.

It will be appreciated that a significant point of the present invention is the economy of masks necessary for the production of all-pass or notch filters when the circuit is fabricated in micro-electronic form. It will also be appreciated that the simplicity with which the circuit may be tailored is also a significant commercial advantage.

What we claim is:

1. A transfer function control network comprising a differential input operational amplifier having an inverting input, a non-inverting input and an output, and having a high gain A; a first element having an admittance $Y_1$ and connected between the said output and the inverting input of the amplifier; a second element having an admittance $Y_2$ and connected between a signal input terminal and the non-inverting input of the amplifier; a third element having an admittance $Y_3$ and a fourth element having an admittance $Y_4$ connected in series between the non-inverting input and the output of the amplifier; a fifth element having an admittance $Y_5$ and connected between a reference terminal and the junction between the third and fourth elements; and a sixth element having an admittance $Y_6$ and connected between the signal input terminal and the inverting input terminal of the amplifier, the arrangement being such that when an input signal $V_1$ is applied between the signal input terminal and the reference terminal an output signal $V_o$ is derived from between the output of the amplifier and the reference terminal so that the transfer function:

$$\frac{V_o}{V_i} = \frac{Y_1Y_2(Y_3+Y_4+Y_5) - Y_6Y_3(Y_4+Y_5)}{Y_1Y_2(Y_3+Y_4+Y_5) + Y_1Y_3Y_5 - Y_3Y_4Y_6 + E/A}$$

where, to a first approximation:

$$\frac{E}{A} = (Y_1+Y_6)\left\{Y_2(Y_3+Y_4+Y_5) + Y_3(Y_4+Y_5)\right\}\left[\frac{1}{A_o} + \frac{s}{2\pi f_T}\right]$$

and where:

$s$ is the complex frequency variable;

$A_o$ is the d.c. gain of the amplifier at very low frequencies; and $f_T$ is characteristic of the frequency performance of the amplifier, that is to say, the gain-bandwidth product of the amplifier.

2. A transfer function control network as claimed in claim 1 wherein: said first element is a first resistance having a conductance $G_1$; said second element is a second resistance having a conductance $G_2$ in parallel with a first capacitor having a capacitance $C_2$; said third element is a second capacitor having a capacitance $C_3$; said fourth element is a third resistance having a conductance $G_4$; said fifth element is a fourth resistance having a conductance $G_5$; and said sixth element is a fifth resistance having a conductance $G_6$, and wherein the transfer function for the network for an input signal $V_i$ and an output signal $V_o$ expressed in terms of the conductances and capacitances of the components and $s$ the complex frequency variable is:

$$\frac{V_o}{V_i} = \frac{G_2G_{45} + s\left\{C_3G_2 + (G_4+G_5)\left[\frac{C_2}{C_3} - \frac{G_6}{G_1}\right]\right\} + s^2C_2C_3}{G_2G_{45} + sC_3\left\{G_2 + G_5 + (G_4+G_5)\left(\frac{C_2}{C_3} - \frac{G_6}{G_1}\right)G_4\right\} + s^2C_2C_3}.$$

3. A transfer function control network as claimed in claim 2 in which the coefficients of $s$, the complex frequency variable, in numerator and denominator the transfer function equation are equal in magnitude and opposite in sign so that the network forms an all-pass network.

4. A transfer function control network as claimed in claim 2 in which the first and fifth resistances and the first and second capacitors are dimensioned such that:

$$\left[\frac{G_6}{G_1}\right] - 1 - 2\left[\frac{C_2}{C_3}\right] = 0.$$

5. A transfer function control network as claimed in claim 4 in which the first and second capacitors are equal in value such that:

$$\left[\frac{C_2}{C_3}\right] = 1.$$

6. A transfer function control network as claimed in claim 2 having its elements dimensioned such that:

$$G_2 + [G_4 + G_5]\left\{\left[\frac{C_2}{C_3}\right] - \left[\frac{G_6}{G_1}\right]\right\} = 0$$

so that it operates as a notch filter network.

7. A transfer function control network as claimed in claim 6 in which the first and second capacitors are equal in value such that:

$$\left[\frac{C_2}{C_3}\right] = 1.$$

* * * * *